United States Patent [19]

Hirota

[11] Patent Number: 4,692,071
[45] Date of Patent: Sep. 8, 1987

[54] THREAD CUTTING MACHINE

[75] Inventor: Akio Hirota, Aichi, Japan

[73] Assignee: Brother Kogyo Kabushiki Kaisha, Aichi, Japan

[21] Appl. No.: 861,821

[22] Filed: May 12, 1986

[30] Foreign Application Priority Data

Jun. 28, 1985 [JP] Japan .................................. 60-143346

[51] Int. Cl.$^4$ ............................................ G05B 19/407
[52] U.S. Cl. ........................................... 408/9; 318/39; 408/8; 408/10
[58] Field of Search ..................... 408/3, 9, 10, 11, 13, 408/8; 318/39, 571; 409/186, 187, 193, 194

[56] References Cited

U.S. PATENT DOCUMENTS 3,346,894 10/1967 Lemelson .......................... 318/39 X
4,157,231 6/1979 Phillips ............................... 408/9 X
4,353,018 10/1982 Kohzai et al. .................... 408/10 X
4,441,059 4/1984 Watanabe ......................... 408/11 X

FOREIGN PATENT DOCUMENTS 31356 8/1972 Japan .
96750 6/1982 Japan ...................................... 408/3

Primary Examiner—Gil Weidenfeld
Assistant Examiner—Steven C. Bishop
Attorney, Agent, or Firm—Finnegan, Henderson, Farabow, Garrett and Dunner

[57] ABSTRACT

A thread cutting machine where the rate of advance of the thread cutting tool is controlled by means of a control system whereby the rotation of the tool and its rate of advance toward the workpiece are both used to control the position of the cutting tool.

7 Claims, 1 Drawing Figure

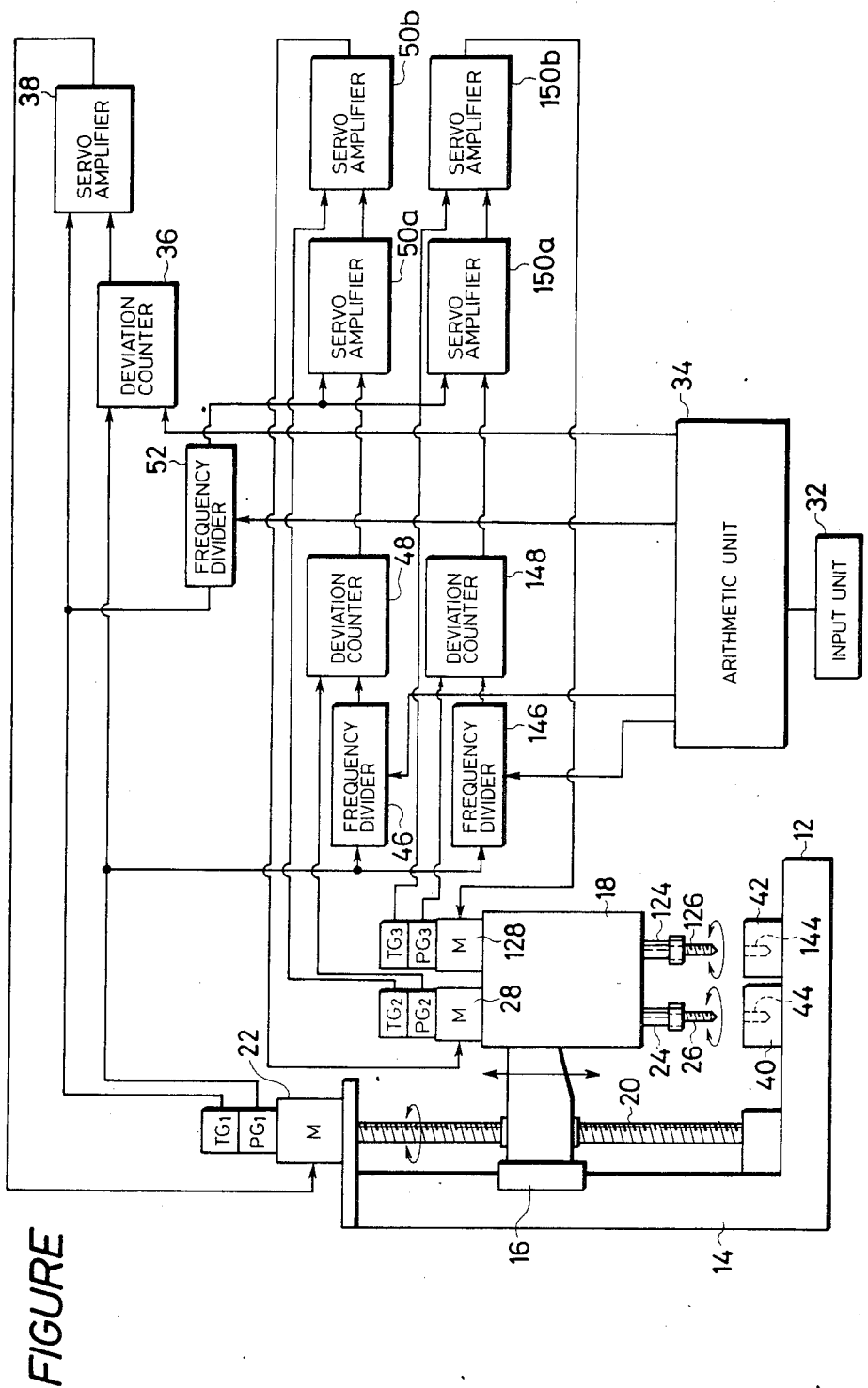
FIGURE

THREAD CUTTING MACHINE

BACKGROUND OF THE INVENTION

This invention relates to thread cutting machines, and more particularly to a thread cutting machine in which the rotation of a thread cutting tool such as a screw tap is controlled according to the amount of movement of a spindle head which rotatably supports the thread cutting tool, thereby to cut the threads in a workpiece with high accuracy.

A tapping machine (or thread cutting machine) carries out a thread cutting operation with a screw tap (or thread cutting tool) initially abutted against a starting hole formed in a workpiece. Such devices include means for rotating a spindle to which the screw tap is secured and means for moving a spindle head, which rotatably supports the spindle, vertically towards the workpiece. The tapping machine, unlike a drilling machine, is to cut threads having a predetermined pitch in a starting hole formed in a workpiece, and therefore as the thread cutting operation with a screw tap is advanced, the screw tap is moved in accordance with the lead angle. Accordingly, it is necessary for the tapping machine that the spindle head is moved in the axial direction in synchronization with the amount of movement per revolution of the spindle holding the screw tap.

In order to meet this requirement, in the conventional thread cutting machine as disclosed, for instance, by Japanese Patent Application Publication No. 31356/1972, a gear is replaceably interposed in a drive system adapted to move the spindle head in the axial direction. In replacing a screw tap for cutting threads of different pitch, the gear is also replaced, so that the spindle head is moved in the axial direction with a lead angle corresponding to the new screw tap. However, the gear replacement system is disadvantageous because whenever the screw tap is replaced before a thread cutting operation, the gear must also be replaced by a gear suitable for the new screw tap. As a result, it is necessary to provide a number of gears according to the different screw taps.

SUMMARY OF THE INVENTION

An object of this invention is to eliminate the above-described difficulties accompanying a conventional tapping machine. More specifically, an object of the invention is to provide a thread cutting machine in which a spindle head moving section outputs a synchronizing signal to rotate the spindle, to which a screw tap is secured, in a speed ratio synchronous with the movement of the spindle head, thereby to accurately move the spindle head and stop it at a predetermined position to perform a thread cutting operation with high efficiency.

To achieve these and other objects of the invention, there is provided a thread cutting machine. The thread cutting machine includes a workpiece supporting stand having a surface for holding a workpiece. A spindle head is movably supported with respect to the workpiece supporting stand and means to move the spindle head in opposite directions toward and away from the workpiece holding surface as provided. A rotatable spindle holds a thread cutting tool with the spindle being rotatably supported by the spindle head. Also included are means for rotating the spindle. A first means is responsible to the spindle head moving means generates a signal corresponding to the movement of the spindle head. A second means for rotating the spindle in accordance with the signal synchronizes the amount of movement per revolution of the spindle with the movement of the spindle head relative to the workpiece holding surface.

BRIEF DESCRIPTION OF THE DRAWINGS

The single FIGURE in the accompanying drawing is an explanatory diagram, partly as a block diagram, for a description of one embodiment of this invention.

DESCRIPTION OF THE PREFERRED EMBODIMENT

One embodiment of this invention will be described with reference to the single FIGURE in the accompanying drawing.

As shown in the FIGURE, a column 14 is arranged vertically on one side of a workpiece supporting stand 12 laid on a table (not shown). An AC servo motor 22 is provided on the upper end of the column 14. The drive shaft (not shown) of the AC servo motor 22 is coupled to a threaded shaft 20, the axis of which is perpendicular to the upper surface of the workpiece supporting stand 12. A slider 16 is threadably engaged with the threaded shaft 20 so that it is moved up and down with rotation of the threaded shaft 20.

One end of the slider 16 is secured to a tool supporting stand (or spindle head) 18 which is moved along the axis of the threaded shaft 20 as the slider 16 moves vertically. Two spindles 24 and 124 are rotatably supported by the tool supporting stand 18 in such a manner that the axes of the spindles are parallel with each other and parallel to the axis of the threaded shaft 20. Thread-cutting tools 26 and 126 having predetermined diameters are detachably coupled to the lower end portions of the spindles 24 and 124, respectively, the upper end portions of which are connected to the drive shafts (not shown) of the AC servo motors 28 and 128, respectively.

Workpieces 40 and 42 are placed on the workpiece supporting stand 12 in a manner that they are located below the threaded cutting tools 26 and 126, respectively. Starting holes 44 and 144 have been previously formed by a separate machine.

A control circuit for the thread cutting machine described above is provided. The control circuit includes a position detecting pulse generator PG1 connected to the tool supporting stand moving the AC servo motor 22. Position detecting pulse generators PG2 and PG3 are connected to the AC servo motors 28 and 128 rotate the spindles 24 and 124 respectively.

In a tool supporting stand feeding system for the thread cutting machine, the pulse generator PG1 applies a position pulse corresponding to the rotational angle of the threaded shaft 20 to a deviation counter 36, and an arithmetic unit 34 outputs an instruction pulse according to the data inputted through an input unit 32. The instruction pulse thus outputted is applied to the deviation counter 36. In the deviation counter 36, the position pulse is compared with the instruction pulse. The deviation value between these pulses is applied to a servo amplifier 38, to control the rotational position of the AC servo motor 22 adapted to move the tool supporting stand. The position pulse applied to the deviation counter 36 from the pulse generator PG1 is further applied to frequency dividers 46 and 146, where it is frequency-divided. The output pulses of these frequency dividers 46 and 146 are applied to deviation counters 48 and 148, respectively.

In a spindle rotating system for the thread cutting machine, the pulse generators PG2 and PG3 output position pulses corresponding to the rotational angles of the thread cutting tools 26 and 126, respectively, and the position pulses thus outputted are applied to the deviation counters 48 and 148, respectively. In the deviation counters 48 and 148, the position pulses thus applied are compared with the position pulses which have been applied through the frequency dividers 46 and 146, respectively. The deviation values betweeen former and latter position pulses are applied to two-stage servo amplifiers 50 and 150 to control the rotation of the spindle rotating AC servo motors 28 and 128, respectively.

This means that, in thread cutting the workpieces 40 and 42 by utilizing the starting holes 44 and 144 with the thread cutting tools 26 and 126, the rotations of the spindles 24 and 124 coupled to the thread cutting tools 26 and 126 are separately controlled in a rotationl ratio based on the amount of movement of the tool supporting stand 18.

Accordingly, if the amount of movement of the tool supporting stand 18 and the rotational frequency of the spindles 24 and 124 are determined so that the thread cutting operations are carried out with pitch corresponding to the particular thread cutting tools 26 and 126 connected to the spindles 24 and 124. The amount of movement and speeds thus determined are inputted by means of the input unit 32 and by operating a start switch (not shown) threaded holes having predetermined diameters are formed in the workpieces 40 and 42, respectively.

The tool supporting stand moving servo motor 22 is provided with a tachometer generator TG1. The output voltage of the tachometer generator TG1 is applied to the speed servo section of the servo amplifier 38. A speed servo system is provided in which the output voltage is compared with the voltage conversion value of the instruction speed, and the speed of the AC servo motor 22 is controlled until the difference between the output voltage and the voltage conversion value becomes zero (0). However, the speed servo system may be omitted.

Similarly, the spindle rotating AC servo motors 28 and 128 are provided with tachometer generators TG2 and TG3, respectively. The output voltages of the tachometer generators TG2 and TG3 are applied to the speed servo sections of the servo amplifiers 50 and 150, where they are compared with the voltage conversion values of the instruction speeds, so that the speeds of the AC servo motors are controlled until the difference between the output voltages and the voltage conversion value becomes zero (0), respectively.

As here embodied, the output voltage is also branched away and applied to a frequency divider 52. A count down voltage is applied to servo amplifier 50a, 150a individually. An output of deviation counter 48 (148) is applied to the servo amplifier 50a (150a). Thus, servo amplifier 50a (150a) outputs a suitable voltage corresponding with a desired speed of the spindle 24 (124). The output voltage of servo amplifier 50a (150a) is compared with the output of the tachometer generator TG2 (TG3) in a servo amplifier 50b (150b) and the speed of AC servo motor is controlled until the differences between the output voltage and the voltage conversion value becomes zero (0).

As was described above, the rotation of the thread cutting tools are controlled by the respective control means according to the amount of movement of the tool supporting stand. Therefore, a plurality of workpieces can be readily threaded in a short time.

As is apparent from the above description of the thread cutting machine according to the invention, by moving the spindle head a predetermined amount, the rotation of the rotating drive means are controlled according to the predetermined movement of the spindle head and the spindle head can be stopped accurately at a predetermined position during thread cutting. Accordingly, workpieces in which starting holes have been cut to predetermined depth can be accurately threaded. In addition, the thread cutting operation can be carried out at high speed and changeover of different thread cutters can be readily accomplished. Thus, the invention is effective in increasing the thread cutting efficiency of such machines.

In the above described embodiment, the AC servo motors are employed as the drive means. However, the embodiment can be modified in various manners; for instance, DC control with DC servo motors may be employed. Furthermore, in the above-described embodiment, the pulse generators PG are used as the position detecting means; however, resolvers or rotary encoders can be employed instead of the pulse generators.

The present invention has been disclosed in terms of a preferred embodiment, however, the invention is not limited thereto. The scope of the invention is determined by the appended claims and their equivalents.

What is claimed is:

1. A thread cutting machine, comprising:
    a workpiece supporting stand having a surface for holding a workpiece; a spindle head movably supported with respect to said workpiece supporting stand; means to move said spindle head in opposite directions towards and away from said workpiece holding surface; a rotatable spindle for holding a thread cutting tool, said spindle being rotatably supported by said spindle head; and means for rotating said spindle;
    first and second means operable to control the position of said thread cutting tool;
    said first means being responsive to said spindle head moving means to generate a signal corresponding to the movement of said spindle head; and
    said second means for rotating said spindle in accordance with said signal to synchronize the amount of movement per revolution of said spindle with the movement of said spindle head relative to said workpiece holding surface.

2. A thread cutting machine as recited in claim 1 wherein the spindle head moving means includes a first AC servo motor and the spindle rotating means includes a second AC servo motor, said thread cutting machine further comprising:
    a third means for generating an instruction signal corresponding to a desired motor speed for said first and second AC servo motors; and
    a fourth means for controlling the motor speed of said first and second AC servo motors in accordance with said instruction signal.

3. A thread cutting machine, comprising:
    a workpiece supporting stand having a surface for holding a workpiece; a spindle head movably supported with respect to said workpiece supporting stand; means to move said spindle head in opposite directions towards and away from said workpiece holding surface; a rotatable spindle for holding a thread cutting tool, said spindle being rotatably supported by said spindle head; means for rotating said spindle;

means for generating an instruction signal corresponding to a selected speed of rotation of a thread cutting tool held by said spindle;

first position detecting means, connected to said spindle head moving means, for generating a first signal corresponding to the movement of said spindle head; means for controlling said spindle head moving means in accordance with said first signal and said instruction signal;

second position detecting means, connected to said spindle rotating means, for generating a second signal corresponding to the rotational angle of a selected thread cutting tool held by said spindle; means for controlling said spindle rotating means in accordance with said first signal and said second signal.

4. A thread cutting machine as recited in claim 3 wherein the spindle head moving means includes a first AC servo motor and the spindle rotating means includes a second AC servo motor, said thread cutting machine further comprising:

a first tachometer generator responsive to said first AC servo motor; a second tachometer generator responsive to said second AC servo motor; said first and second tachometer generator operative for generating a first and second output voltage, respectively;

means for generating a second instruction signal corresponding to a desired motor speed for said first and second AC servo motors; means for converting said second instruction signal to a voltage conversion value;

a first and second servo amplifier responsive to said voltage conversion value and said first and second output voltages, respectively, for controlling the speeds of said first and second AC servo motors, respectively.

5. A thread cutting machine, comprising:

a workpiece supporting stand for supporting at least one workpiece, said work piece supporting stand having a surface for holding said workpiece, a column arranged vertically on one side of said workpiece supporting stand by said column, a spindle head movable supported with respect to said workpiece supporting stand by said column, a plurality of spindles rotatably supported by said spindle head, the axes of said spindles disposed parallel each other, a thread-cutting tool detachably coupled to the lower end portion of each of said spindles, means to rotate each of said spindles, moving means to move said spindle head in opposite directions toward and away from said workpiece holding surface; and means to control said rotating means governed by said moving means.

6. A thread cutting machine, comprising:

a workpiece supporting stand having a surface for holding a workpiece;

a spindle head movably supported with respect to said workpiece supporting stand;

a first AC servo motor to move said spindle head in opposite directions toward and away from said workpiece holding surface;

a rotatable spindle for holding a thread cutting tool, said spindle being rotatably supported by said spindle head;

a second AC servo motor to rotate said spindle;

first and second means operable to control the position of said thread cutting tool;

said first means responsive to said first AC servo motor to generate a signal corresponding to the movement of said spindle head; and said second means for rotating said spindle in accordance with said signal to synchronize the amount of movement per revolution of said spindle with the movement of said spindle head relative to said workpiece holding surface.

7. A thread cutting machine, comprising:

a workpiece supporting stand for supporting at least one workpiece, said workpiece supporting stand having a surface for holding said workpiece;

a column and a threaded shaft arranged vertically on one side of said workpiece supporting stand;

a spindle head movably supported with respect to said workpiece supporting stand by said column and said threaded shaft;

a spindle rotatably supported by said spindle head;

a thread cutting tool detachably coupled to the lower end portion of said spindle;

a first AC servo motor to rotate said spindle;

a second AC servo motor to move said spindle head in opposite directions toward and away from said workpiece holding surface, said second AC servo motor directly coupled to said threaded shaft; and means to control said first AC servo motor governed by said second AC servo motor.

* * * * *